United States Patent Office 3,455,818
Patented July 15, 1969

3,455,818
CHROMATOGRAPHIC PROCESS
Robert F. Leifield, Pasadena Hills, Mo., assignor to Mallinckrodt Chemical Works, St. Louis, Mo., a corporation of Missouri
No Drawing. Filed June 15, 1966, Ser. No. 557,625
Int. Cl. B01d 15/08
U.S. Cl. 210—31                    3 Claims

ABSTRACT OF THE DISCLOSURE

Improved sorbent sheets useful for chromatography are prepared by dispersing fine fibers of a suitable material, preferably a non-cellulosic material such as fibrous glass, together with a high proportion of the desired powdered sorbent, such as silicic acid, in a suitable liquid medium, flowing the resulting slurry onto a porous support and removing the liquid. The sorbent-loaded sheets thus formed are characterized by having the sorbent supported by the fibrous matrix material and exhibit an advantageous combination of properties including high capacity, resolving power and defining power.

---

This invention relates to sorption and more particularly to sorbent media in sheet form and methods of using such media in sheet form.

Briefly, the present invention is directed to non-cellulosic, sorbent-loaded sheets, especially sheets of the type which are adapted to use in chromatography. The invention also includes methods of using the novel sorbent sheets of the type indicated.

Among the several objects of the invention may be mentioned the provision of improved sorbent sheets; the provision of such sheets which are useful for chromatography; the provision of such sheets in a wide range of thicknesses; the provision of sheets of the type described having high capacity, resolving power and defining power; the provision of self-supporting chromatography sheets having the advantages of thin-layer chromatographic media; the provision of sheets of the type indicated which are useful in the rapid extemporaneous preparation of chromatographic columns; and the provision of methods of using the novel sheets described above. Other objects and features of the invention will be in part apparent and in part pointed out hereinafter.

The invention accordingly comprises the methods hereinafter described, the scope of the invention being indicated in the following claims.

Chromatography was first described by Tswett [Proc. Warsaw Soc. Nat. Sci., Biol. Sect. 14, No. 6 (1903)]. He found that complex mixtures of plant pigments could be separated by dissolving them in petroleum ether and passing the solution through a column of calcium carbonate. Various yellow and green zones were formed on the column in a definite order and the pigments could be reproducibly separated. Although the word "chromatography" was derived from the Greek chroma or "color" and graphos, "to write," in scientific usage the word has come to mean separation of a mixture into its components, colored or not, by similar operations. Several specific methods have evolved, for example, adsorption and partition chromatography on columns, paper chromatography and thin layer chromatography.

E. Stahl [Pharmazie 11, 633 (1956)] first described the technique which has come to be known as thin layer chromatography (TLC). This technique involves spreading a thin layer (usually 250 microns thick) of a sorbent-water slurry on a glass plate. The most commonly used sorbent is silica or alumina, usually with a small proportion of a binder, such as calcium sulfate, to improve adhesion to the plate. After the layer is completely spread, it is activated by drying. The activation level or degree of activity achieved depends upon the time and, more importantly, the temperature of drying.

After the thin layer has been activated, a drop of solution containing the multiple species to be separated is applied to the sorbent layer near one end of the plate, and the carrier solvent is allowed to evaporate. The spotted plate is placed in a closed chamber in an upright position, with the lower edge (nearest the applied spot) immersed in solvent at the bottom of the chamber. As the solvent rises through the sorbent layer by capillary action, the components of the applied spot separate into individual spots in a line perpendicular to the lower edge of the plate. After the solvent rises the desired distance (generally 10–15 cm.) the plate is removed from the solvent and the solvent is allowed to evaporate from the plate.

Separated spots may or may not be visible to the naked eye. Colorless spots can be made visible by a variety of methods. For example, the spots may be charred by spraying the plate with a mixture of sulfuric acid and an oxidizing agent (potassium permanganate or potassium dichromate) and then heating the plate. Another method of visualizing the spot involves incorporating a phosphor into the sorbent layer. Upon irradiation with an ultraviolet lamp, the phosphor glows, and substances which absorb U.V. radiation appear as black spots against the fluorescing background.

The mechanics of paper chromatography are similar in many respects to those of thin layer chromatography. In classical paper chromatography a strip or sheet of specially prepared or selected cellulose filter paper, rather than the thin layer of silica or alumina, is used as the sorbent.

H. Flood [Z. Anal. Chem., 120, 327–35 (1940)] was perhaps the first to suggest the preparation of a chromatographic paper containing an inorganic sorbent. Flood impregnated a paper with hydrated alumina, for example, by dipping the paper in a solution of sodium aluminate, drying this product, then moistening it with a solution of sodium bicarbonate to precipitate the alumina. J. G. Kirchner and G. J. Keller [J. Am. Chem. Soc., 72, 1867 (1950)] prepared a silica-impregnated paper in a similar manner. They soaked ordinary filter paper in sodium silicate solution, drained it, and immersed the product in dilute hydrochloric acid to precipitate silicic acid as a chromatographic sorbent.

J. W. Dieckert and R. Reiser, [Science, 120, 678 (1954), J. Am. Oil Chemists' Soc., 33, 123 (1956)] applied the Kirchner et al. technique to impregnate a glass-fiber filter paper with silicic acid.

Three properties are important in chromatographic media of the sheet type: capacity, resolving power and defining power. Capacity refers to the total weight of mixed species that can be successfully resolved from a single initial spot on the chromatographic sheet. Resolving power is the ability to obtain clean-cut separations of different species. Defining power is judged by the relative area covered by the spot due to a single species following development of the chromatogram. The smaller the area the better the defining power of the sheet.

Capacity of a chromatographic sheet is dependent on the concentration of the sorbent used. Other things being equal, the capacity is also dependent on the surface area of the sorbent and will generally increase as the surface area increases. Therefore, formation of sheets containing a high percentage of active sorbent is a desirable feature. Increased capacity of the chromatographic sheet can be accomplished not only by increasing the ratio of sorbent to matrix material but also by increasing the quantity of available sorbent by increasing the sheet thickness.

The defining power of a chromatographic sheet is dependent on the diffusion gradients it imposes upon the sample. These are of two types. The first is normal "concentration gradient" diffusion. In this case, samples tend to spread or diffuse from a high to a low concentration. This tendency is defined quantitatively by Fick's law:

(1) $$-\frac{dc}{dt} = D\frac{dc}{dx}$$

C=concentration
T=time
X=distance traveled
D=diffusivity

As a result, in every system spots become larger when development distance (or time) increases.

Loss of definition may be minimized by keeping the development distance to a minimum. As an obvious corollary, keeping development time to a minimum also helps to keep spot size small. Times on the order of less than 60 minutes are desirable.

The other factor leading to increased diffusivity and loss of spot definition is eddy diffusion. In this discussion, eddy diffusion refers to flow turbulence induced by sorbent particle dimensions. It may be visualized as the increased horizontal movement of the molecules in a spot which results from movement around (or along) large or irregularly-shaped particles (or fibers). Small, uniform sorbent particles should keep this type of induced diffusion to a minimum. This is generally considered to be the key to successful TLC techniques and is the inherent reason why definition on TLC plates is so superior to common paper techniques. Cellulose fibers used in paper manufacture are commonly longer than 1 mm., and preferential diffusion along their length can occur. In desirable TLC sorbents, on the other hand, particles have diameters on the order of 5–25µ and thus contribute considerably less to eddy diffusion.

Resolving power can be affected if the sorbent medium is nonhomogenous. If, for example, two sorbents with different adsorption isotherms are used, one preferentially adsorbing the unknown with respect to the other, "streaking" and "tailing" of the resulting spots will occur.

Uniformity of sorption media is therefore desirable, and further, all components of the media should respond uniformly to any activation or formation conditions one would use.

In one of its aspects, the present invention is directed to sorbent-loaded sheets comprising an independently prepared, substantially white sorbent supported in a fibrous matrix.

When such sheets are designed to be used in the practice of chromatography, it is particularly advantageous to use as the fibrous matrix a non-cellulosic material that is resistant to the action of corrosive agents, such as sulfuric acid, potassium dichromate, etc., which are frequently used to assist in developing or visualizing separated spots, as discussed above.

The chromatographic sheets of the present invention, for example, are prepared by dispersing fine fibers of a suitable non-cellulosic corrosion resistant material, together with a high proportion of the desired powdered sorbent, in a suitable liquid medium, flowing this slurry onto a porous support surface and removing the liquid, leaving a sheet in which the sorbent is supported by the fibrous matrix material. These sheets are analogous to a loaded or filled paper and may be made by means of certain types of equipment used in paper technology.

When a non-cellulosic fibrous material is to be used in forming the supporting matrix in the sorbent sheets of the present invention, fibrous glass is the most suitable material. It is commercially available in a variety of compositions, fiber diameters and fiber lengths. For most applications rather fine fibers (diameter of 0.5 micron or less) are preferred, although fibers having diameters as great as the 5–25 micron range may be suitable for some applications. Increasing fiber diameter increases eddy diffusion and adversely affects the defining power of the finished sheet.

In addition to glass, other non-cellulosic corrosion-resistant fibrous materials that may be used to form the supporting matrix in the sorbent-loaded sheets of the present invention include fibrous alumina (boehmite), asbestos, silica and chemically resistant synthetic polymers, such as polytetrafluoroethylene. Other suitable materials will occur to those skilled in the art.

As sorbents for use in the sheets of the invention, in addition to silica (silicic acid), other white, inorganic active sorbent powders, such as alumina, zirconia, titania and rare earths, may be used. Suitable sorbents other than those specifically mentioned will occur to those skilled in the art.

Water is normally the liquid medium used in the preparation of the sheets of the present invention. However, in special instances it may be desirable to use aqueous alcoholic or alcoholic or other non-aqueous media which will not adversely affect the chromatographic properties of the sorbent.

Chromatography with the sheets of the present invention is carried out in much the same general manner as conventional thin layer or paper chromatography.

The sorbent-loaded chromatographic sheets of the present invention possess a combination of desirable chromatographic properties. An accepted method of evaluating chromatographic media involves the resolution of a standard test dye mixture. This is a benzene solution containing equal concentrations of p-dimethylaminoazobenzene (Buter Yollow), 1 - (o-methoxyphenylazo) - 2-naphthol (Sudan Red G) and N-(p-dimethylaminophenyl)-1,4-naphthoquinoneimine (Indophenol Blue).

With a single sorbent loaded sheet of the present type it has been found possible to resolve as little as 0.6 microgram and as much as 4.5 milligrams of combined dyes as presented in the test dye solutions described above. Thus, with these sheets, one obtains the desirable combination of both high sensitivity and high capacity in a single sheet.

While the chromatographic sheets of he present invention are primarily used as indicated above, they may also be used in column chromatography. The relatively thicker sheets are best for this application. A chromatographic column may be quickly prepared by rolling one or several of such sheets into a compact roll and inserting it into a glass tube or cylinder. The resulting column functions in a manner very similar to that of a conventional chromatographic column.

The following examples illustrate the invention:

EXAMPLE 1

An aqueous slurry of glass micro-fibers and silicic acid sorbent was prepared. The glass fiber used was Johns-Manville Code 100 fiber (average fiber length, ⅛ inch; average fiber diameter, 0.05–0.1 micron). The silicic acid sorbent was a TLC sorbent grade of silicic acid supplied under the trademark Silicar. This is a finely powdered (−325 mesh) silica hydrogel consisting of approximately 80–90% $SiO_2$ and 10–20% water. The glass fiber (1.5 g) and sorbent (7.5 g.) were milled with 500 ml. of water in a high shear mill (Waring-type blendor) for five minutes to disperse the solids thoroughly. The resulting slurry was cast into an 8″ x 8″ Williams hand mold fitted with a fairly fine (50–100 mesh) screen, and the resulting sorbent-loaded sheets were allowed to drain dry. They were then activated by heating them in an oven at 110° C. for one hour. Sheets of various thicknesses in the range of 10–30 mils, and containing approximately 80% sorbent were prepared by this method.

EXAMPLE 2

Sorbent-loaded sheets having a thickness (1.5–4 mm.)

greater than those described in Example 1 were prepared by the same general method. In this case the feed slurry was made from 6 g. of J–M 104 glass fiber (average fiber diameter, 0.2–0.5 microns); and 30 g. of silicic acid TLC sorbent in 500 ml. of water. The sorbent loading in these sheets was comparable to that in the sheets of Example 1.

EXAMPLE 3

Additional thin (30–34 mils) and thick (2–4 mm.) sorbent-loaded sheets were prepared by the method of Examples 1 and 2, with the following exception. In addition to the glass fiber and silicic acid sorbent, the feed slurry contained a binder (calcium sulfate) and a finely powdered white phosphor of the alkaline earth halophosphate type which fluoresces under irradiation by ultraviolet light of 2534 A. The phosphor/sorbent/binder ratio in the feed was 5.6/79.3/15.1.

EXAMPLE 4

Sorbent-loaded sheets of up to 35 mil thickness, with and without phosphor were prepared by means of a 14 inch Fourdrinier machine.

(a) Glass-fiber (J–M 104, 29 lbs.) was added to a tank of rapidly stirred water (1,000 gal.). This mixture was passed through a high shear Jordan mill to obtain satisfactory dispersion. Silicic acid TLC sorbent (145 lbs.) was then dispersed in this slurry.

The above described stock slurry was passed through a head box chest and a head box onto the wire at the minimum speed setting of 15 ft./min. Reinforcement was obtained by means of glass fiber scrim as a backing and polyethylene film as a cover and release film. Sheets 12 inches wide and 15 mils thick were obtained.

(b) The proportion of sorbent was then increased by adding 95 lbs. of silicic acid sorbent to 500 gallons of the original slurry remaining in the stock tank and 14 lbs. of silicic acid sorbent to the head box chest. With this modified stock, 29 mil sheet was obtained, using the glass fiber scrim and polyethylene release film.

(c) To obtain phosphor modified sheets, 15 lbs. of phosphor was added to 400 gallons of modified stock in the stock tank, and 4.5 lbs. of phosphor to the head box chest. With the aid of scrim and release film, 32 mil sheet was obtained at 12 inch width, and 35 mil sheet at 8 inch width.

EXAMPLE 5

Sorbent loaded sheets similar to those previously described were prepared on an 8″ cylinder-type papermaking machine. Sheets 30–100 mils thick were thus obtained.

EXAMPLE 6

Thin sheets (5–40 mils) loaded with silicic acid sorbent, prepared as described in Examples 1 and 4, are activated by heating in an oven at 85° C. for a half hour. The activated sheets are used immediately or are stored in a good desiccator with a desiccant more effective than silica gel. A benzene solution of mixed dyes (0.1% each of Butter Yellow, Sudan Red G, and Indophenol Blue) is applied to the surface of the sheet by means of a micropipette. The dye solution is applied in a series of spots, representing graded amounts of the dye mixture. The spots are placed in a uniform row about one inch from one edge of the sheet.

The spotted sheet is hung in a closed chamber over an open vessel of benzene for ½–1 hour to allow the sheet to come to equilibrium with the benzene atmosphere. The sheet is then lowered to permit immersion of a strip about ⅛″ wide, below the dye spots, in benzene. The chromatogram is developed until the solvent front has moved a distance of 10 cm., measured from the line of applied spots. The essential characteristics of the resulting chromatogram (definition, resolution, sensitivity, development time) approach those obtainable with a conventional thin layer plate.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. A process for chromatographically resolving a mixture, which process comprises the steps of applying a solution of the mixture to a sorbent-loaded sheet comprising a silicic acid sorbent substantially uniformly dispersed in and supported by a fibrous matrix, said fibrous matrix being composed of fibers having a diameter not greater than 0.5 micron, said silicic acid sorbent consisting essentially of silica hydrogel in the form of a fine powder substantially all of which passes a 325 mesh screen, and thereafter developing the resulting chromatogram with a suitable solvent.

2. A process as set forth in claim 1 wherein the sorbent-loaded sheet further contains a white phosphor.

3. A process as set forth in claim 1 wherein the fibrous matrix of the sorbent-loaded sheet is fibrous glass.

References Cited

UNITED STATES PATENTS

| | | |
|---|---|---|
| 2,678,132 | 5/1954 | Beard. |
| 3,252,270 | 5/1966 | Pall et al. |
| 3,303,043 | 2/1967 | Halpaap et al. |
| 3,327,859 | 6/1967 | Pall. |
| 3,335,185 | 8/1967 | Dykes. |

OTHER REFERENCES

Dieckert et al.: "Glass-Fiber Paper," Science, vol. 120, p. 678, October 1954.

Hamilton et al.: "Glass-Paper Chromatography," Arch. Biochem. Biophys., vol. 82, 1959, pp. 203–211.

Ory et al.: "Glass-Paper Chromatography," Anal. Chem., vol. 31, August 1959, p. 1447.

REUBEN FRIEDMAN, Primary Examiner

C. M. DITLOW, Assistant Examiner

U.S. Cl. X.R.

210—198, 502